US009724793B2

(12) United States Patent
Lee et al.

(10) Patent No.: US 9,724,793 B2
(45) Date of Patent: Aug. 8, 2017

(54) PISTON ASSEMBLY MOUNTING APPARATUS FOR ENGINE

(71) Applicant: Hyundai Motor Company, Seoul (KR)

(72) Inventors: Youngseock Lee, Ulsan (KR); Yongtae Kim, Ulsan (KR); Dokyoung Ji, Ulsan (KR); Fa-Young So, Pyeongtaek-si (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 14/547,681

(22) Filed: Nov. 19, 2014

(65) Prior Publication Data
US 2015/0183069 A1 Jul. 2, 2015

(30) Foreign Application Priority Data

Dec. 30, 2013 (KR) ........................ 10-2013-0167808

(51) Int. Cl.
| B23P 19/04 | (2006.01) |
| B25J 9/00 | (2006.01) |
| B23P 19/12 | (2006.01) |

(52) U.S. Cl.
CPC ........... B23P 19/043 (2013.01); B25J 9/0087 (2013.01); B23P 19/12 (2013.01); *Y10T 29/53435* (2015.01); *Y10T 29/53978* (2015.01)

(58) Field of Classification Search
CPC ....... B23P 19/04; B23P 19/043; B23P 19/042; B23P 19/12; B25J 9/0087
See application file for complete search history.

(56) References Cited

U.S. PATENT DOCUMENTS

| 6,886,241 B2 | 5/2005 | Tachibana et al. | |
| 2014/0023472 A1* | 1/2014 | Sueoka | B23P 19/001 414/589 |
| 2014/0137689 A1* | 5/2014 | Nogami | B25J 18/00 74/490.05 |

FOREIGN PATENT DOCUMENTS

| JP | 7-328869 A | 12/1995 |
| JP | 10-118857 A | 5/1998 |
| JP | 2000-711134 A | 3/2000 |
| KR | 10-2013-0057105 A | 5/2013 |
| WO | WO 2012/081057 A1 | 6/2012 |
| WO | WO2012/143969 A1 | 10/2012 |

* cited by examiner

*Primary Examiner* — Christopher Besler
(74) *Attorney, Agent, or Firm* — Morgan Lewis & Bockius LLP

(57) ABSTRACT

A piston assembly mounting apparatus for an engine may include a robot having two multijoint arms movable in a predetermined range, a taking-out unit mounted at a free end of one of the arms of the robot and clamping and taking out one of a plurality of piston assemblies, and a fitting unit mounted at a free end of another of the arms of the robot, receiving and clamping the one piston assembly taken out of the taking-out unit, and then inserting the one piston assembly into a cylinder of a cylinder block.

10 Claims, 8 Drawing Sheets

(S100)

(S200)

PISTON ASSEMBLY MOUNTING APPARATUS FOR ENGINE

CROSS-REFERENCE TO RELATED APPLICATION

This application claims priority to Korean Patent Application No. 10-2013-0167808 filed Dec. 30, 2013, the entire contents of which is incorporated herein for all purposes by this reference.

BACKGROUND OF THE INVENTION

Field of the Invention

The present invention relates to a piston assembly mounting apparatus for an engine. More particularly, the present invention relates to a piston assembly mounting apparatus for an engine which automatically mounts a piston assembly with con-rods in the cylinders of a cylinder block.

Description of Related Art

In general, a piston is a part that transmits kinetic energy by fluid pressure to the outside and changes an applied force into fluid pressure while reciprocating in a cylinder.

The pistons of a vehicle are generally disposed in the cylinder block of the engine and generate power by transmitting the explosive force of a gas mixture to the crankshaft through connecting rods.

Those pistons are assembled in piston assemblies with con-rods connected with the crankshaft and an oil ring and a compression ring on their inner and outer sides in a piston assembly line and then carried to an engine assembly line, and a worker takes out the piston assemblies one by one in person in the engine assembly line, moves them to a cylinder block, and then inserts and mounts them in cylinders, respectively.

However, since the piston assemblies of the related art are manually mounted on the cylinder block of an engine by a worker in person, when a piston assembly is inserted into a cylinder from above the cylinder block, the con-rod rotatably mounted on the piston may hit against the cylinder block or the piston ring may be locked on the inner side of the cylinder by a mistake or carelessness of the worker, such that there is a problem in that the cylinder block and the piston assembly may be damaged or broken.

Further, the assembly time is too much and the cycle time in the engine assembly line increases due to the manual work, such that there is another problem in that productivity decreases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a piston assembly mounting apparatus for an engine having advantages of being able to prevent piston assemblies and a cylinder block from being damaged and broke and improve productivity by reducing the cycle time in an assembly line, by automatically taking out piston assemblies that are assembled and then carried and by automatically mounting them in the cylinders of a cylinder block.

According to various aspects of the present invention, a piston assembly mounting apparatus for an engine may include a robot having two multijoint arms movable in a predetermined range, a taking-out unit mounted at a free end of one of the arms of the robot and clamping and taking out one of a plurality of piston assemblies, and a fitting unit mounted at a free end of another of the arms of the robot, receiving and clamping the one piston assembly taken out of the taking-out unit, and then inserting the one piston assembly into a cylinder of a cylinder block.

The taking-out unit may include a first mounting plate of which one side is mounted at the free end of the one arm of the robot, a guider that protrudes at a first side on another side of the first mounting plate and has a guide hole where a con-rod of the piston assembly is inserted, and on which a bottom of the piston is seated, a first actuating cylinder mounted at a second side of the other side of the first mounting plate, and clampers that are disposed at both sides of the guide hole under the guider, connected with the first actuating cylinder, and slide toward the guide hole and clamp the con-rod under the guide hole when the first actuating cylinder moves.

The first actuating cylinder may be a two-axis finger cylinder with sliding rods at both sides of the guide hole where the clampers are mounted, respectively.

The fitting unit may include a second mounting plate mounted at the free end of the other arm of the robot, a second actuating cylinder mounted under the second mounting plate, at least two or more piston clampers arranged at predetermined angles around the second actuating cylinder and clamping an outer side of the piston of the piston assembly taken out by the taking-out unit in accordance with whether the second actuating cylinder operates, a fitting cylinder that includes an actuating rod, is mounted on the second mounting plate with the actuating rod through the center of the second actuating cylinder, and fits the piston assembly clamped by the piston clamper into the cylinder of the cylinder block; con-rod clamping units that are disposed at both sides of the second mounting plate, behind the second actuating cylinder, and selectively fix the con-rod of the piston assembly clamped by the piston clampers, and a piston clamper guide unit that is disposed between the second actuating cylinder and the con-rod clamping unit and restricts an unclamping range of the piston clampers in accordance with a diameter of the cylinder of the cylinder block.

The second actuating cylinder may be a four-axis finger cylinder with sliding rods at corners at each 90° around the actuating rod of the fitting cylinder where the piston clampers mounted.

The piston clamper may have an insertion end that is integrally formed on a bottom thereof, may be inserted at a predetermined level in the cylinder of the cylinder block, and may guide the piston of the piston assembly, when the piston assembly is moved down by the fitting cylinder.

The fitting cylinder may be connected with a load cell thereon, sense a load on the actuating rod of the fitting cylinder through the load cell, and keep the load constant by controlling an operation pressure.

The con-rod clamping unit may include a third actuating cylinder disposed at both sides of the fitting unit under the second mounting plate, and a con-rod clamper of which one end is hinged to the third actuating cylinder and another end clamps the lower portion of the con-rod while turning to the con-rod of the piston assembly clamped by the piston clampers in accordance with whether the third actuating cylinder operates.

The piston clamper guide unit may include a fourth actuating cylinder that has an actuating rod and is disposed under the second mounting plate between the second actuating cylinder and the con-rod clamping unit, and a clamper guider that is mounted at a free end of the actuating rod of the fourth actuating cylinder, over the piston clampers, and moved up/down by the fourth actuating cylinder.

The clamper guider may have a multi-step that is stepped downward on an inner side coming in contact with the piston clamper and restrict the movement range of the fourth actuating cylinder and the piston clamper.

The piston assembly mounting apparatus for the engine may further include a sub-pallet adapted that the piston assemblies are seated thereon, and a main pallet disposed to be spaced from the sub-pallet and adapted that the cylinder block is seated thereon, in which the free end of the one arm is disposed to correspond to the sub-pallet, and the free end of the other arm is disposed to correspond to the main pallet.

As described above, according to the piston assembly mounting apparatus for an engine according to an exemplary embodiment of the present invention, it is possible to prevent piston assemblies and a cylinder block from being damaged and broken and improve the commercial value and productivity by reducing the cycle time in the assembly line, by automatically taking out the piston assemblies that are assembled and then carried and by automatically mounting the piston assemblies into cylinders of the cylinder block.

Further, the apparatus can be used regardless of different kinds of piston assemblies having different sizes and the inner diameter of cylinders of a cylinder block, so the manufacturing cost can be reduced.

Further, since the piston assemblies are automatically mounted rapidly and accurately into the cylinders of the cylinder block, it is possible to reduce the manufacturing cost, including the labor expenses of the worker due to manual work, and minimize the manpower.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", "0 . . . member" etc. used herein mean the units of inclusive components performing at least one or more functions or operations.

Figure 1:
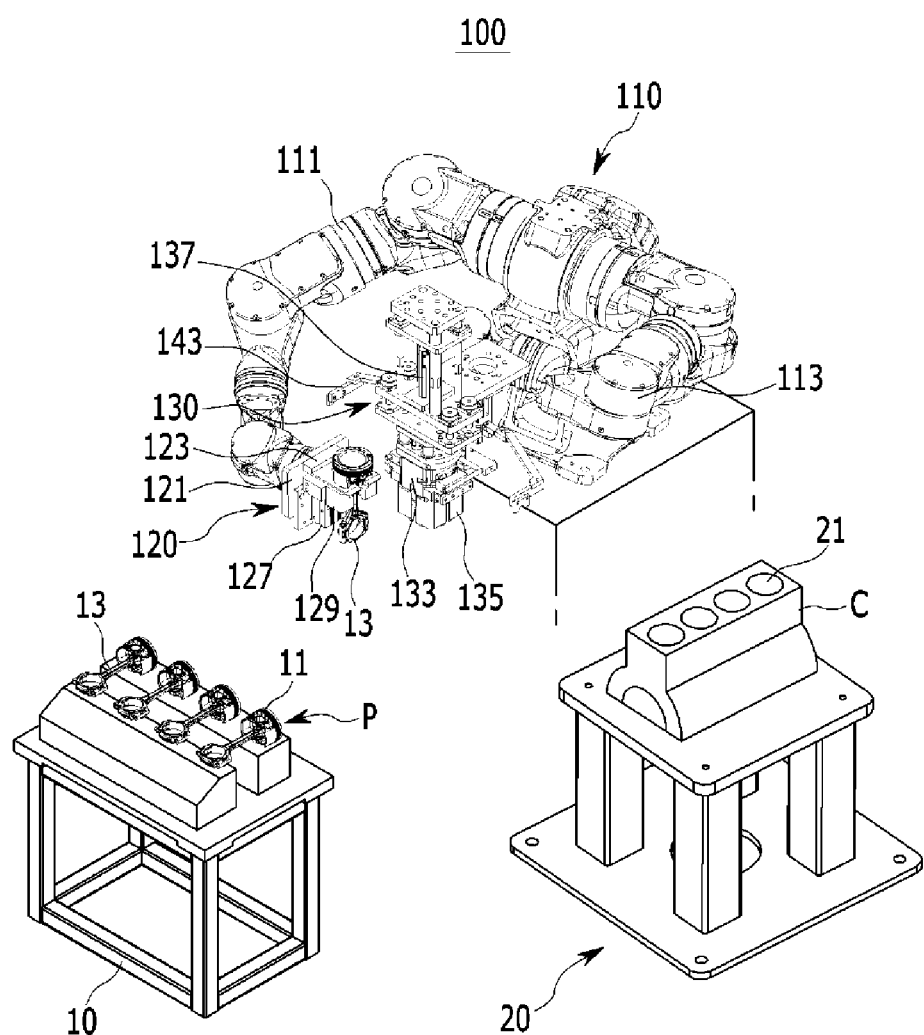
FIG. 1 is a schematic diagram of an exemplary piston assembly apparatus for an engine according to the present invention.
Figure 2:
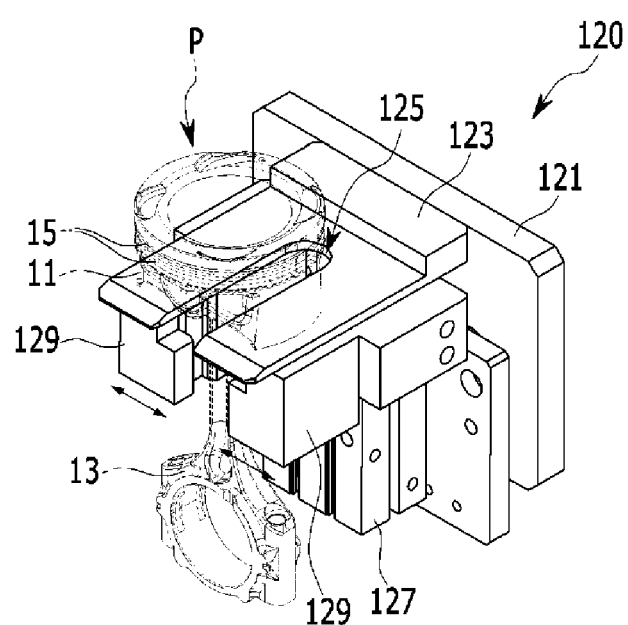
FIG. 2 is a perspective view of a taking-out unit used in the exemplary piston assembly apparatus for the engine according to the present invention.
Figure 3A:
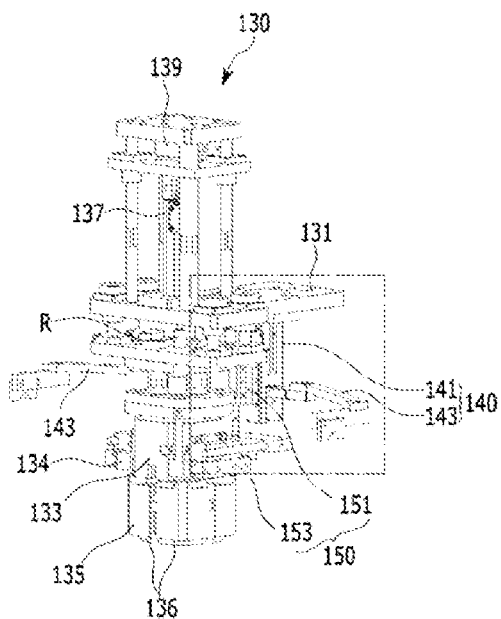
FIG. 3A and FIG. 3B are perspective views of a fitting unit used in the exemplary piston assembly apparatus for the engine according to the present invention.
Figure 3B:
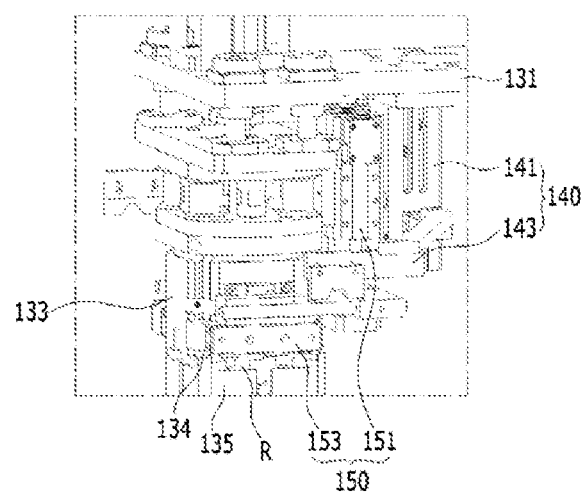

FIG. 1 is a schematic diagram of a piston assembly apparatus for an engine according to various embodiments of the present invention, FIG. 2 is a perspective view of a taking-out unit used in the piston assembly apparatus for the engine according to various embodiments of the present invention, and FIG. 3A and 3B are perspective views of a fitting unit used in the piston assembly apparatus for the engine according to various embodiments of the present invention.

Referring to the figures, a piston assembly mounting apparatus 100 for an engine according to various embodiments of the present invention can prevent piston assemblies P and a cylinder block C from being damaged and broken and improve productivity by reducing the cycle time in the assembly line, by automatically taking out the piston assemblies P that are assembled and then carried and by automatically mounting the piston assemblies into cylinders 21 of the cylinder block C.

To this end, the piston assembly mounting apparatus 100 for an engine according to various embodiments of the present invention, as shown in FIG. 1, includes piston assemblies P, a cylinder block C, a robot 110, a taking-out unit 120, and a fitting unit 130.

First, a plurality of piston assemblies P is carried to an engine assembly line and seated on a sub-pallet 10, with con-rods 13 and piston rings 15 assembled with pistons in a piston assembly line.

The cylinder block C is seated on a main pallet 20 spaced from the sub-pallet 10 in the engine assembly line.

The robot 110 has two multijoint arms 111 and 113 movable in a predetermined range, corresponding to the positions of the sub-pallet 10 and the main pallet 20.

The arms 111 and 113 of the robot 110 may be freely moved by a robot controller (not shown).

In various embodiments, the taking-out unit 120 is mounted at the free end of one arm 111, which corresponds to the sub-pallet 10, of the arms of the robot 110 and clamps and takes out one of the piston assemblies P on the sub-pallet 10.

The taking-out unit 120, as shown in FIG. 2, includes a first mounting plate 121, a guider 123, a first actuating cylinder 127, and a clamper 129.

One side of the first mounting plate 121 is mounted at the free end of the arm 111 of the robot 110.

On the other side of the first mounting plate 121, the guider 123 protrudes at one side, a guide hole 125 where a con-rod 13 of the piston assembly P is inserted is formed, and the bottom of the piston 11 is seated on the top of the guider 123.

The guide hole 125 may be formed in the shape of a slot with the free end of the guider 123 open.

The first actuating cylinder 127 is mounted at the other side of the other surface of the first mounting plate 121.

The clamper 129 is disposed at both sides of the guide hole 125 under the guider 123 and connected with the first actuating cylinder 127, and when the first actuating cylinder 127 moves, the clamper 129 slides toward the guide hole 125 and clamps the con-rod 13 under the guide hole 125.

The first actuating cylinder 127 may be a two-axis finger cylinder with sliding rods at both sides of the guide hole 125 where the clampers 129 are mounted, respectively.

In the finger cylinder, the sliding rods open outward from the center or close to the center in accordance with whether an operation pressure is supplied, and it is well known in the art, so the configuration and operation are not described in detail herein.

That is, when the arm 111 is moved to the sub-pallet 10 by the robot 110, the taking-out unit 120 having the configuration inserts the con-rod 13 of the piston assembly P laid on the sub-pallet 10 into the guide hole 125 of the guider 123 such that the piston 11 is positioned on the guider 123, and the clamper is operated to clamp the con-rod 13 by the first actuating cylinder 127, such that clamping is completed.

Thereafter, the taking-out unit 120 takes out the piston assembly clamped by the robot 110 and finishes the operation with the piston 13 of the piston assembly P up.

The fitting unit 130 is mounted at the free end of the arm 113 corresponding to the main pallet 20 of the arms of the robot, receives and clamps the piston assembly P taken out of the taking-out unit 120, and then inserts it into the cylinder 21 of the cylinder block C.

The fitting unit 130, as shown in FIG. 3A and FIG. 3B, includes a second mounting plate 131, a second actuating cylinder 133, piston clampers 135, a fitting cylinder 137, con-rod clamping units 140, and a piston clamper guide unit 150.

First, the second mounting plate 131 is mounted at the free end of the arm 113 of the robot 110 and the second actuating cylinder 133 is mounted under the second mounting plate 131.

At least two or more piston clampers 135 are provided and they are arranged at predetermined angles around the second actuating cylinder 133 and clamp the outer side of the piston 11 of the piston assembly P taken out by the taking-out unit 120 in accordance with whether the second actuating cylinder 133 operates.

The fitting cylinder 137 includes an actuating rod R, is mounted on the second mounting plate 131 with the actuating rod R through the center of the second actuating cylinder 133, and fits the piston assembly P clamped by the piston clamper 135 into the cylinder 21 of the cylinder block C by pressing the piston 11 of the piston assembly P.

The fitting cylinder 137 is connected with a load cell 139 thereon and can sense the load by the actuating rod R of the fitting cylinder 137 through the load cell 139 and keep the load by the actuating rod R constant by controlling the operation pressure.

The second actuating cylinder 133 may be a four-axis finger cylinder with sliding rods 134 at the corners at each 90° around the actuating rod R of the fitting cylinder 137 where the piston clampers 135 mounted.

Accordingly, four piston clampers 135 may be disposed at the corners at each 90° around the rectangular second actuating cylinder 133.

In the second actuating cylinder 133, sliding rods 134 slide toward the center of the second actuating cylinder 133 or slide outward away from the center in accordance with whether an operation pressure is supplied, in the same way as in the first actuating cylinder 127, and it is well known in the art, so the configuration and operation are not described in detail herein.

The piston clampers 135 may have an insertion end 136 that is integrally formed on the bottom, is inserted at a predetermined level in the cylinder 21 of the cylinder block C, and guides the piston 11 of the piston assembly P, when the piston assembly P is moved down by the fitting cylinder 137.

The insertion ends 136 are integrally formed on the bottom of the piston clamper 135 above the cylinder 21, and when the piston clampers 135 are opened by the second actuating cylinder 133, the insertion ends 136 are positioned to fit to the diameter of the cylinder 21, such that the piston assembly P can be smoothly inserted into the cylinder 21.

In various embodiments, the con-rod clamping units 140 are disposed at both sides of the second mounting plate 131, behind the second actuating cylinder 133, and selectively fix the con-rod 13 of the piston assembly P clamped by the piston clampers 135.

The con-rod clamping unit 140 includes a third actuating cylinder 141 disposed at both sides under the second mounting plate 131 and a con-rod clamper 143 of which one end is hinged to the third actuating cylinder 141 and the other end clamps the lower portion of the con-rod 13 while turning to the con-rod 13 of the piston assembly P clamped by the piston clampers 135 in accordance with whether the third actuating cylinder 141 operates.

That is, when the piston 11 of the piston assembly P is clamped by the piston clampers 135, the con-rod clamping unit 140 clamps the con-rod 13 to prevent the con-rod 13 under the piston 11 from moving and rotating around the piston 11 when the arm 113 of the robot 110 operates.

The con-rod clamping units 140 restrict movement of the con-rod 13 by clamping the lower portion of the con-rod 13 with the con-rod clampers 143 that are opened toward both sides of the fitting unit 130 and turned to the con-rod 13 by the third actuating cylinders 141.

The piston clamper guide unit 150 is disposed between the second actuating cylinder 133 and the con-rod clamping unit 140 and restricts the range of unclamping of the piston clampers 135 in accordance with the diameter of the cylinder 21 of the cylinder block C.

The piston clamper guide unit 150 includes a fourth actuating cylinder 151 that includes an actuating rod and is disposed under the second mounting plate 131 between the second actuating cylinder 133 and the con-rod clamping unit 140 and a clamper guider 153 that is mounted at the free end of the actuating rod of the fourth actuating cylinder 151, over the piston clampers 135, and moved up/down by the fourth actuating cylinder 151.

The clamper guider 153 has a multi-step that is stepped downward on the inner side coming in contact with the piston clamper 135 and can restrict the movement range of the fourth actuating cylinder 151 and the piston clamper 135.

Figure 4:
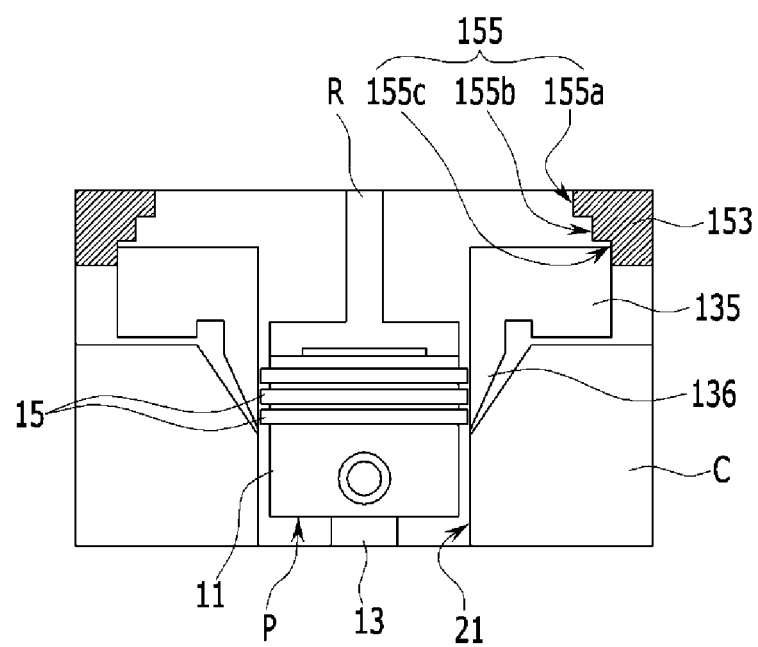
FIG. 4 is a view illustrating the concept of a piston clamper guide unit used in the exemplary piston assembly apparatus for an engine according to an exemplary embodiment of the present invention.

The step 155, as shown in FIG. 4, may be composed of a first step 155a farthest protruding toward the piston clamper 135, a second step 155b formed toward the outer side of the piston clamper 135 from the first step 155a, and a third step 155c formed toward the outer side of the piston clamper 135 from the second step 155b.

The operation of the piston clamper guide unit 150 having this configuration is described with reference to FIG. 5A. FIG. 5B, and FIG. 5C.

Figure 5A:
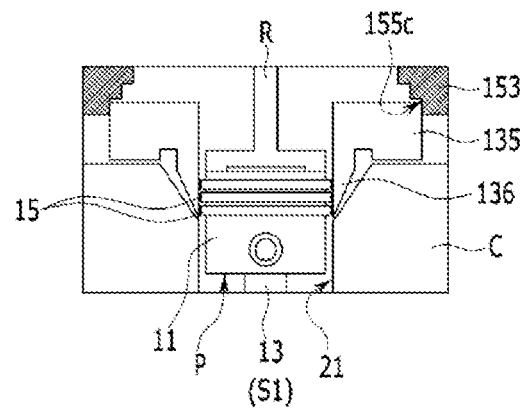
FIG. 5A.
Figure 5B:
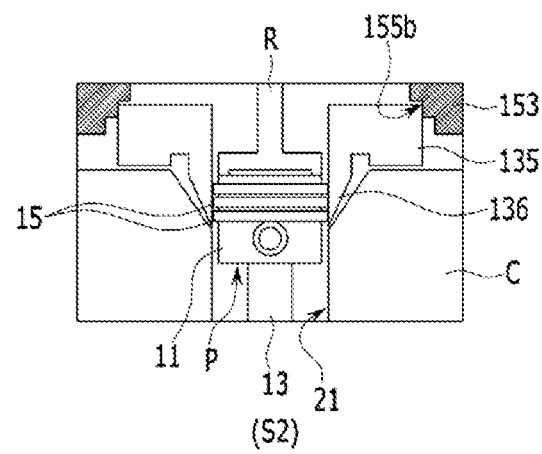
FIG. 5B, and FIG. 5C are schematic views illustrating the operation of diameter-classified piston clamper guide units used in the exemplary piston assembly apparatus for the engine according to the present invention.
Figure 5C:
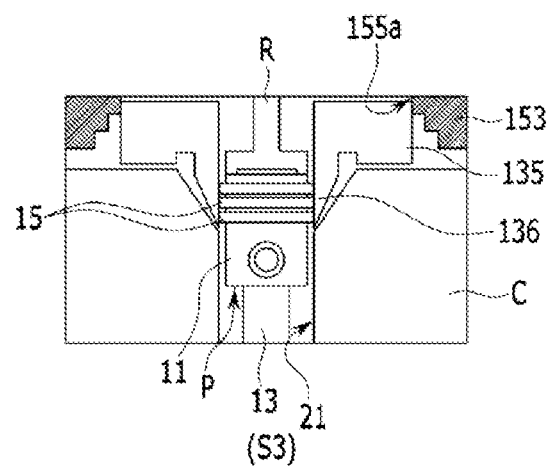

FIG. 5A. FIG. 5B, and FIG. 5C are schematic views illustrating the operation of diameter-classified piston clamper guide units used in the piston assembly apparatus for an engine according to various embodiments of the present invention.

That is, in the piston clamper guide unit 150 having the configuration, when the inner diameter of the cylinder 21 is large, the fourth actuating cylinder 151 moves down the clamper guider 153 so that the third step 155c is positioned outside the piston clamper 135, as in (S1) of FIG. 5A.

In this state, as the second actuating cylinder 133 operates, the piston clampers 135 come in contact with the third step 155c, such that the insertion end 136 is positioned to fit to the diameter of the cylinder 21.

In contrast, when the inner diameter of the cylinder 21 is smaller than that in (S1), the fourth actuating cylinder 151 moves down so that the second step 155b is positioned outside the piston clampers 135, as in (S2) of FIG. 5B.

When the inner diameter of the cylinder 21 is more small, the fourth actuating cylinder 151 further moves down so that the first step 155a is positioned outside the piston clampers 135, as in (S3) of FIG. 5C.

That is, the first step 155a is brought in contact with the outer sides of the piston clampers 135, when the inner diameter of the cylinder 21 is smallest.

The second step 155b and the third step 155c are brought in contact with the outer sides of the piston clampers 135 in accordance with the magnitude of the inner diameter of the cylinder 21.

Accordingly, the first, second, and third steps 155a, 155b, and 155c restrict the movement range of the piston clampers 135 that are opened by the second actuating cylinder 133.

The operation and action of the piston assembly mounting apparatus 100 for an engine according to an exemplary embodiment of the present invention which has the configuration are described in detail hereafter.

Figure 6:
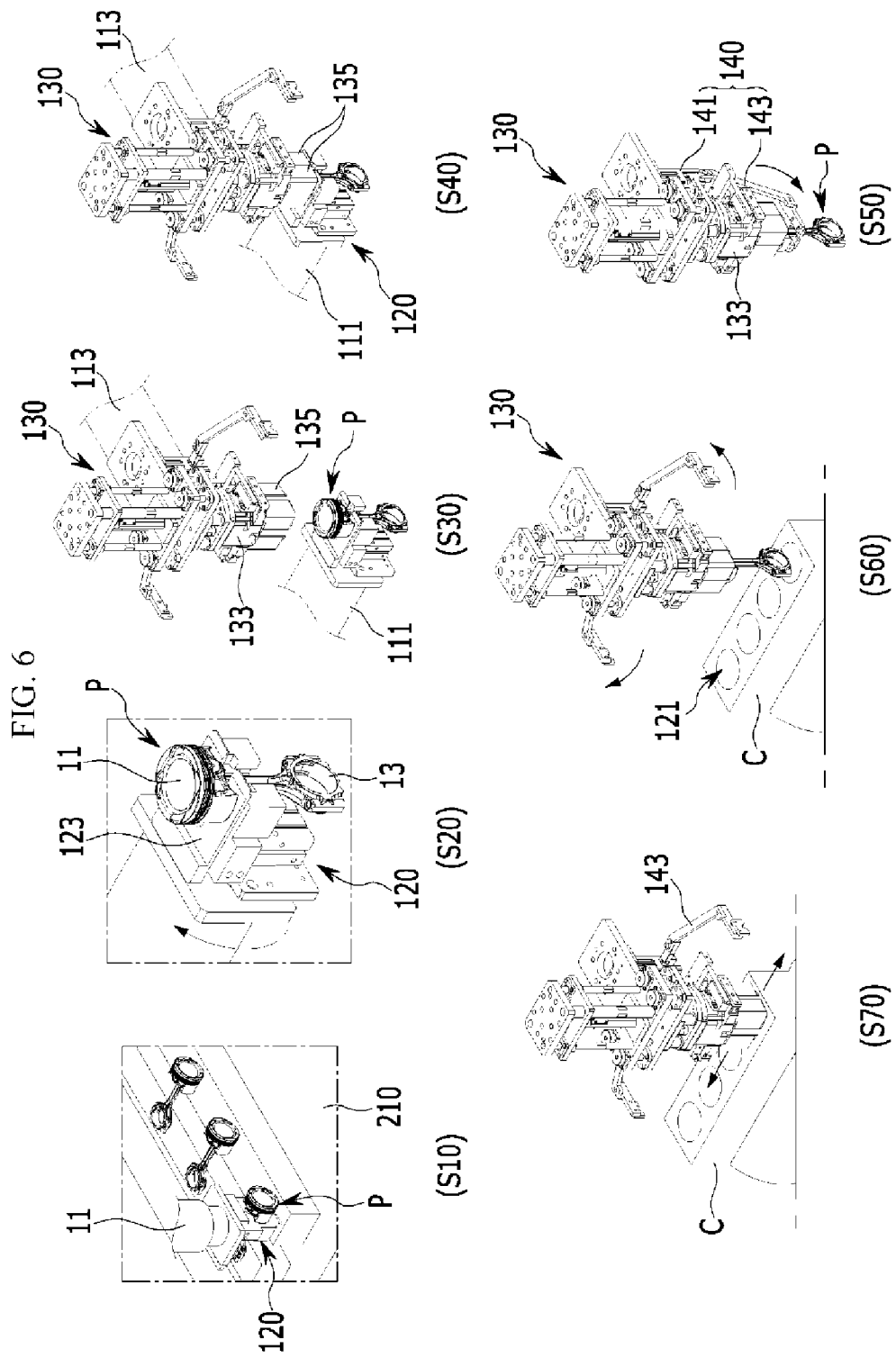
FIG. 6 is a view showing the operation in each step of the exemplary piston assembly apparatus for the engine according to the present invention.
Figure 7A:
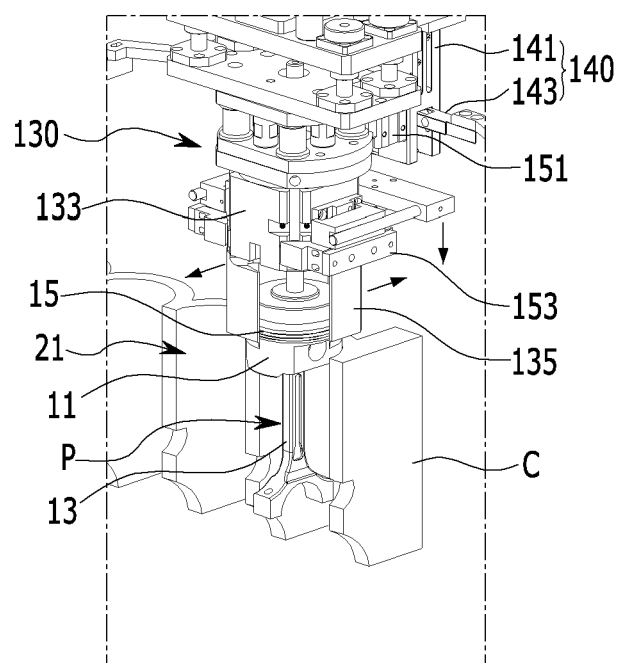
FIG. 7A and FIG. 7B are views showing a step of inserting a piston assembly into a cylinder in the exemplary piston assembly apparatus for the engine according to the present invention.
Figure 7B:
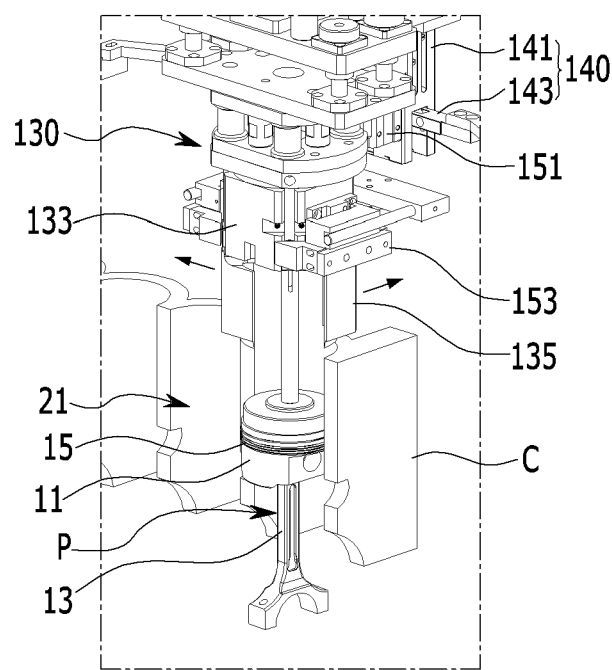

FIG. 6 is a view showing the operation in each step of the piston assembly apparatus for the engine according to various embodiments of the present invention and FIG. 7A and FIG. 7B are views showing the step of inserting a piston assembly into a cylinder in the piston assembly apparatus for the engine according to various embodiments of the present invention.

First, as in (S10) of FIG. 6, when the arm 11 is moved to a piston assembly P on the sub-pallet 10 by the robot 110, the taking-out unit 120 inserts the con-rod 13 of the piston assembly P into the guide hole 125 of the guider 123 such that the piston 11 is positioned on the guider 123.

In this state, the piston assembly P is clamped by clamping the con-rod 13 with the clampers 129 operated by the first actuating cylinder 127 and then the clamped piston assembly P is taken out by the robot 110.

Thereafter, the robot 110 moves the taking-out unit 120 so that the piston 11 of the piston assembly P is positioned up, as in (S20) of FIG. 6.

In this state, as in (S30) of FIG. 6, the arms 111 and 113 are moved by the robot 110 and the fitting unit 130 is positioned over the taking-out unit 120, and then the piston clampers 135 are moved to the unclamping position by the second actuating cylinder 133 over the piston 111 of the piston assembly P.

Thereafter, as the fitting unit 130 is moved to the piston assembly P by the arm 113 of the robot 110 and the piston clampers 135 clamp the outer side of the piston 11, as in (S40) of FIG. 6, the clampers 129 of the taking-out unit 120 are moved to the unclamping position and the taking-out unit 120 is moved back to the sub-pallet 10 by the robot 110.

Then, the con-rod clamping units 140 clamp the con-rod 13 of the piston assembly P by turning the con-rod clampers 143 with the third actuating cylinder 141, as in (S50) of FIG. 6, such that movement of the con-rod 13 is restricted when the robot 110 moves.

Thereafter, when the piston assembly P is disposed in place in a cylinder 21 of the cylinder block C on the main pallet 20 by the robot 110, as in (S60) of FIG. 6, the con-rod clampers 143 unclamp the piston assembly by the third actuating cylinder 141.

In this state, the fitting unit 130 moves down to the cylinder 21, as in (S70) of FIG. 6, and the piston clampers 135 unclamp the piston assembly by the second actuating cylinder 133.

The unclamping range of piston clampers 135 is restricted to fit to the inner diameter of the cylinder 21 by the piston clamper guide unit 150.

In this state, the actuating rod R of the fitting cylinder 137 of the fitting unit 130 presses the top of the piston of the piston assembly P while moving down, as in (S100) of FIG. 7A, such that the piston assembly P is inserted into the cylinder 21, as in (S200) of FIG. 7B.

The load cell 139 senses the load on the actuating rod R of the fitting cylinder 137 and the load on the actuating rod R keeps constant by controlling the operation pressure.

When the piston assembly P is inserted in the cylinder 21, the fitting cylinder 137 moves up the actuating rod R and the fitting unit 130 is moved back over the taking-out unit 120 that has moved after take out the piston assembly P by the robot 110, as in (S30), such that piston assemblies P are mounted in the cylinders 21 of the cylinder block C by repeating the process described above.

Therefore, according to the piston assembly mounting apparatus 100 for an engine according to various embodiments of the present invention, it is possible to prevent piston assemblies P and a cylinder block C from being damaged and broken and improve the commercial value and productivity by reducing the cycle time in the assembly line, by automatically taking out the piston assemblies P that are assembled and then carried and by automatically mounting the piston assemblies into cylinders 21 of the cylinder block C.

Further, the apparatus can be used regardless of different kinds of piston assemblies P having different sizes and the inner diameter of cylinders 21 of a cylinder block C, so the manufacturing cost can be reduced.

Additionally, since the piston assemblies P are automatically mounted rapidly and accurately into the cylinders 21 of the cylinder block C, it is possible to reduce the manufacturing cost, including the labor expenses of the worker due to manual work, and minimize the manpower.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A piston assembly mounting apparatus for an engine, comprising:
    a robot having two multi-joint arms movable in a predetermined range;
    a taking-out unit mounted at a free end of a first arm of the arms of the robot and configured for clamping and taking out one of a plurality of piston assemblies; and
    a fitting unit mounted at a free end of a second arm of the arms of the robot, configured for receiving and configured for clamping the one piston assembly taken out of the taking-out unit, and then configured for inserting the one piston assembly into a cylinder of a cylinder block,
    wherein the fitting unit includes:
        a first mounting plate mounted at the free end of the second arm of the robot;
        a first actuating cylinder mounted under the first mounting plate;
        at least two or more piston clampers arranged at predetermined angles around the first actuating cylinder and configured for clamping an outer side of the piston of the piston assembly taken out by the taking-out unit in accordance with an operation of the first actuating cylinder;
        a fitting cylinder that includes an actuating rod, is mounted on the first mounting plate with the actuating rod through a center of the second actuating cylinder, and is configured for fitting the piston assembly clamped by the piston clamper into the cylinder of the cylinder block;
        con-rod clamping units that are disposed at both sides of the first mounting plate, behind the second actuating cylinder, and are configured to selectively fix a con-rod of the piston assembly clamped by the piston clampers; and
        a piston clamper guide unit that is disposed between the first actuating cylinder and the con-rod damping unit and is configured for restricting an unclamping range of the piston clampers in accordance with a diameter of the cylinder of the cylinder block.

2. The apparatus of claim 1, wherein the taking-out unit includes:
    a second mounting plate of which a first side is mounted at the free end of the first arm of the robot;
    a guider that protrudes at a first side on a second side of the second mounting plate and has a guide hole where a con-rod of the piston assembly is configured to be inserted, and on which a bottom of the piston is configured to be seated;
    a second actuating cylinder mounted at a second side on the second side of the second mounting plate; and
    clampers that are disposed at opposing sides of the guide hole under the guider, connected with the first actuating cylinder, and configured to slide toward the guide hole and configured to clamp the con-rod under the guide hole when the second actuating cylinder is configured to move.

3. The apparatus of claim 2, wherein the second actuating cylinder is a two-axis finger cylinder with sliding rods at both sides of the guide hole where the clampers are mounted, respectively.

4. The apparatus of claim 1, wherein the first actuating cylinder is
    a four-axis finger cylinder with sliding rods at corners at each 90° around the actuating rod of the fitting cylinder where the piston clampers mounted.

5. The apparatus of claim 1, wherein the piston clamper has an insertion end that is integrally formed on a bottom thereof, is configured to be inserted at a predetermined level in the cylinder of the cylinder block, and is configured to guide the piston of the piston assembly, when the piston assembly is moved down by the fitting cylinder.

6. The apparatus of claim 1, wherein the fitting cylinder is connected with a load cell thereon, is configured to sense a load on the actuating rod of the fitting cylinder through the load cell, and is configured to keep the load constant by controlling an operation pressure.

7. The apparatus of claim 1, wherein the con-rod clamping unit includes:
    a third actuating cylinder disposed at both sides of the fitting unit, under the first mounting plate; and
    a con-rod clamper of which one end is hinged to the third actuating cylinder and another end is configured to clamp a lower portion of the con-rod while turning to the con-rod of the piston assembly clamped by the piston clampers in accordance with whether the third actuating cylinder is configured to operate.

8. The apparatus of claim 1, wherein the piston clamper guide unit includes:
    a fourth actuating cylinder that has an actuating rod and is disposed under the first mounting plate between the first actuating cylinder and the con-rod clamping unit; and
    a clamper guider that is mounted at a free end of the actuating rod of the fourth actuating cylinder, over the piston clampers, and configured to be moved up/down by the fourth actuating cylinder.

9. The apparatus of claim 8, wherein the clamper guider has a multi-step that is stepped downward on an inner side coming in contact with the piston clamper and restricts movement range of the fourth actuating cylinder and the piston clamper.

10. The apparatus of claim 1, further comprising:
a sub-pallet adapted to allow the piston assemblies to be seated thereon; and
a main pallet disposed to be spaced from the sub-pallet and adapted to allow the cylinder block to be seated thereon,
wherein the free end of the first arm is disposed to correspond to the sub-pallet, and the free end of the second arm is disposed to correspond to the main pallet.

* * * * *